US005284050A

United States Patent [19]

Iida et al.

[11] Patent Number: 5,284,050

[45] Date of Patent: Feb. 8, 1994

[54] SELF-DIAGNOSIS APPARATUS IN SYSTEM FOR PREVENTION OF SCATTERING OF FUEL EVAPORATION GAS

[75] Inventors: Hisashi Iida, Aichi; Toshihiro Suzumura, Nagoya; Toshio Kondo; Shigenori Isomura, both of Kariya, all of Japan

[73] Assignee: Nippondenso Co., Ltd., Kariya, Japan

[21] Appl. No.: 863,091

[22] Filed: Apr. 3, 1992

[30] Foreign Application Priority Data

Apr. 8, 1991 [JP] Japan .................................. 3-075405
Apr. 8, 1991 [JP] Japan .................................. 3-075413

[51] Int. Cl.[5] ............................................ G01M 19/00
[52] U.S. Cl. .................................................... 73/118.1
[58] Field of Search ........................ 73/3, 117.3, 118.1, 73/118.2; 340/438, 439

[56] References Cited

U.S. PATENT DOCUMENTS 4,794,790 1/1989 Margarit-Metaxa et al. .
5,014,548 5/1991 Tomisawa .......................... 73/118.1
5,095,743 3/1992 Tomisawa .......................... 73/118.1
5,103,055 4/1992 Kano et al. ......................... 73/118.1
5,150,689 9/1992 Yano et al. .......................... 123/519

FOREIGN PATENT DOCUMENTS 2-102360 4/1990 Japan .
2-130255 5/1990 Japan .
2-130256 5/1990 Japan .
2-136558 5/1990 Japan .
3-3958 1/1991 Japan .
3-26862 2/1991 Japan .

*Primary Examiner*—Robert Raevis
*Attorney, Agent, or Firm*—Cushman, Darby & Cushman

[57] ABSTRACT

There is disclosed a self-diagnosis apparatus in which when detecting a supply abnormally (i.e., failure to lead fuel evaporation gas into an intake passage), the abnormality can be accurately detected, taking into consideration variations in the fuel gas density (variations in the ambient temperature, variations in the volatility of the fuel, and etc.) due to the residual air in a fuel tank. In the apparatus, the amount of flow of the gas from the fuel tank to a canister can be detected, and a control circuit controls a purge valve to close a fuel gas discharge passage, and in this condition the control circuit detects the amount of flow of the gas from the fuel tank to the canister. When this flow amount exceeds a set value, the control circuit controls the purge valve to close and open the discharge passage, and judges in accordance with a change in an air-fuel ratio detected at this time by an $O_2$ sensor whether or not any abnormality exists. If the control circuit judges by this judgment that there exists abnormality, the set value of the gas flow amount is set to a value greater than said set value, and the abnormality judgment is again effected. Then, if this judgment result still indicates that abnormality exists, a warning lamp is turned on to give warning.

5 Claims, 11 Drawing Sheets

SELF-DIAGNOSIS APPARATUS IN SYSTEM FOR PREVENTION OF SCATTERING OF FUEL EVAPORATION GAS

BACKGROUND OF THE INVENTION

Field of the Invention

This invention relates to a self-diagnosis apparatus in a system for preventing the scattering of fuel evaporation gas.

Description of the Related Art

There is known a system which is used in an automobile for preventing the scattering of fuel evaporation gas. This system prevents the fuel evaporation gas, generated in a fuel tank, from being scattered into the atmosphere. More specifically, the fuel evaporation gas generated in the fuel tank is fed into a canister, and is absorbed by activated carbon in the canister. Further, the evaporation gas is fed via a purge pipe into an intake manifold of an engine by a negative pressure in the intake manifold, and is burnt in the engine. Japanese Patent Unexamined Publication No. 2-136558 discloses a self-diagnosis apparatus in a system for preventing the scattering of fuel evaporation gas. In this apparatus, when the pressure within the fuel tank is above a predetermined level, a purge valve provided in the above purge passage is opened and closed, and in accordance with a change in the air-fuel ratio obtained at this time, it is judged whether or not there is encountered abnormality. Namely, in this self-diagnosis apparatus, after confirming the generation of the fuel evaporation gas, the purge valve is opened and closed so as to judge whether or not any abnormality, such as the clogging of the purge pipe, exists.

The assignee of the present application has proposed in Japanese Patent Application No. 2-195474 a system in which when the amount of flow of gas supplied from a fuel tank to a canister reaches a predetermined value, a purge valve is opened and closed, and in accordance with a change in the air-fuel ratio obtained at this time, it is judged whether or not there is encountered abnormality. Namely, depending on the volume of the liquid fuel in the tank, the flow amount of the gas supplied to the canister varies, and therefore by determining the gas flow amount, the self-diagnosis is effected, taking into consideration variations in the amount of generation of the fuel evaporation gas which variations are dependent on a change in the volume of the liquid fuel in the tank.

However, even in such self-diagnosis apparatus, no consideration is given to variations in the fuel gas density due to the residual air in the fuel tank. Namely, if the fuel gas density is low even though the amount of flow of the gas supplied from the fuel tank to the canister is above the predetermined value, the amount of the fuel evaporation gas absorbed by the canister is small, which results in a possibility that even when the purge valve is opened and closed, no change appears in the air-fuel ratio, so that it is considered that abnormality is encountered.

SUMMARY OF THE INVENTION

It is an object of this invention to provide a self-diagnosis apparatus which when detecting a supply abnormality (i.e., failure to lead fuel evaporation gas into an intake passage), can make an accurate judgment, taking into consideration variations (variations in the ambient temperature, the volatility of the fuel, etc.) due to the residual air in a fuel tank.

According to the present invention, as shown in FIG. 11, there is provided a self-diagnosis apparatus in a system for preventing the scattering of fuel evaporation gas, comprising a canister M2 communicated with a fuel tank M1 and containing an absorption material for absorbing fuel evaporation gas in the fuel tank M1; a discharge passage M4 communicating the canister M2 with an intake passage M3 of an internal combustion engine; opening/closing means M5 provided in the discharge passage M4 so as to open and close the discharge passage M4; air-fuel ratio detection means M6 for detecting an air-fuel ratio of an air-fuel mixture supplied to the internal combustion engine; gas flow amount detection means M7 for detecting the amount of flow of the gas supplied from the fuel tank M1 to the canister M2; judgment means M8 for controlling the opening/closing means M5 to close the discharge passage M4, and then for controlling the opening/closing means M5 to close and open the discharge passage M4 when the gas flow amount detection means M7 detects that the amount of the gas flow supplied from the fuel tank M1 to the canister M2 exceeds a set value, and for judging in accordance with a change in the air-fuel ratio detected at this time by the air-fuel ratio detection means M6 whether or not any abnormality exists; judgment control means M9 for setting the above set value of the gas flow amount to a value greater than the set value when the judgment means M8 judges that there exists abnormality, and then for causing the judgment means M8 to again judge whether or not there is any abnormality; and warning means M10 for giving warning when the result of the judgment of the judgment means M8 executed by the judgment control means M9 indicates that there is abnormality.

The judgment means M8 controls the opening/ closing means M5 to close the discharge passage M4, and in this condition the judgment means M8 controls the opening/closing means M5 to close and open the discharge passage M4 when the gas flow amount detection means M7 detects that the amount of the gas flow supplied from the fuel tank Ml to the canister M2 exceeds the set value, and then the judgment means M8 judges in accordance with a change in the air-fuel ratio detected at this time by the air-fuel ratio detection means M6 whether or not any abnormality exists. Then, the judgment control means M9 sets the above set value of the gas flow amount to a value greater than the set value when the judgment means M8 judges that there exists abnormality, and then the judgment control means M9 causes the judgment means M8 to again judge whether or not there is any abnormality. The warning means M10 gives warning when the result of the judgment of the judgment means M8 executed by the judgment control means M9 indicates that there is abnormality.

DESCRIPTION OF THE PREFERRED EMBODIMENTS

One preferred embodiment of the present invention will now be described with reference to the drawings.

Figure 1:
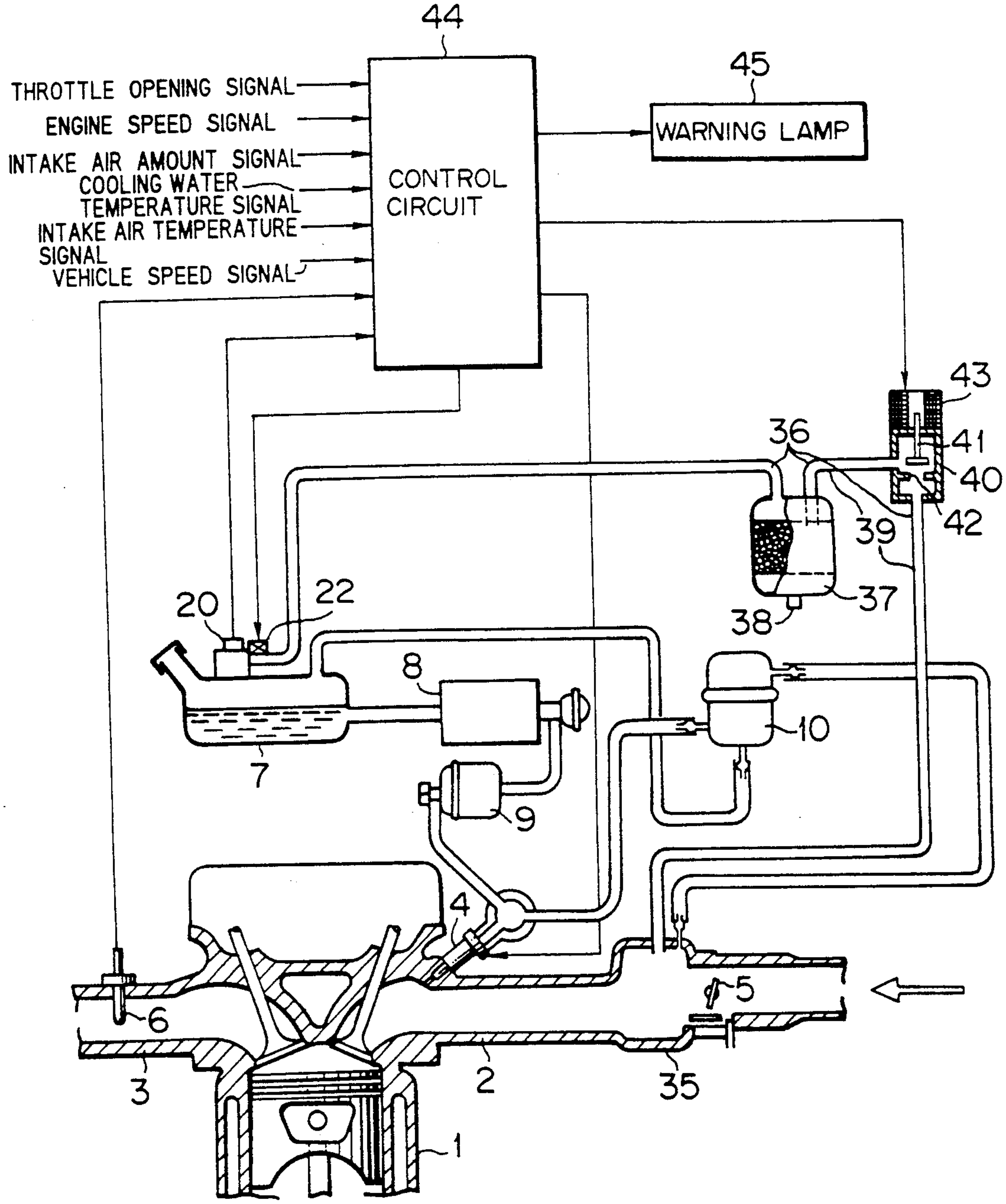
FIG. 1 is a view of a self-diagnosis apparatus of the present invention associated with an engine.

A multi-cylinder engine 1, serving as an internal combustion engine shown in FIG. 1, is mounted on a vehicle, and an intake manifold (intake passage) 2 and an exhaust manifold 3 are connected to the engine 1. An electromagnetic fuel injection valve 4 is provided in each of cylinder intake portions of the intake manifold 2, and a throttle valve 5 is provided in the intake manifold 2. An $O_2$ sensor 6 serving as an air-fuel ratio detection means is provided in the exhaust manifold 3, and outputs a voltage signal in accordance with the oxygen concentration in an exhaust gas.

In a fuel supply system for supplying fuel to the fuel injection valves 4, the fuel is fed under pressure by a fuel pump 8 from a fuel tank 7 to each fuel injection valve 4 via a fuel filter 9, and the fuel to be supplied to each fuel injection valve 4 is adjusted to a predetermined pressure by a pressure control valve 10.

Figure 2:
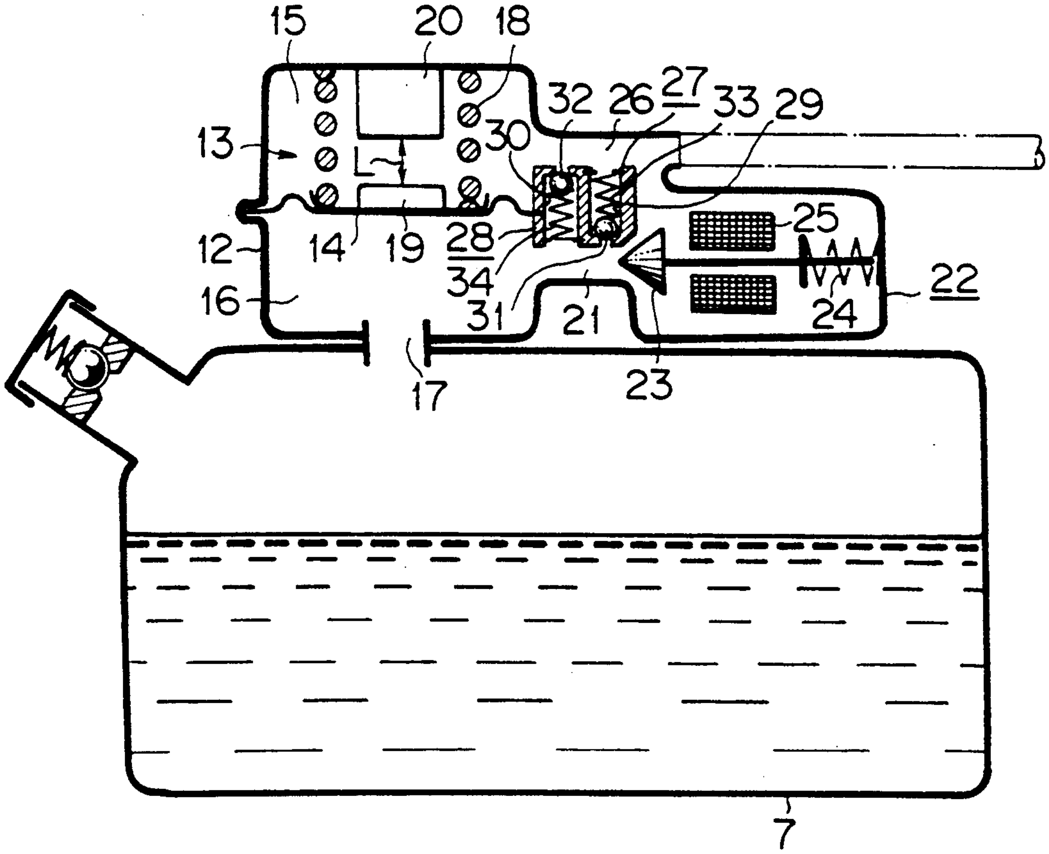
FIG. 2 is a cross-sectional view of a fuel tank portion incorporating one example of fuel evaporation gas flow amount sensor of the present invention.

As shown in FIG. 2, a sensor housing 12 is fixedly mounted on the upper surface of the fuel tank 7, and a diaphragm chamber 13 is formed within the sensor housing 12. The diaphragm chamber 13 is divided by a diaphragm 14 into an upper chamber 15 and a lower chamber 16, and the lower chamber 16 is communicated with the interior of the fuel tank 7 via a communication port 17. A spring 18 is mounted within the upper chamber 15, and urges the diaphragm 14 downward by its urging force. A permanent magnet 19 is fixedly secured to the diaphragm 14, and a flux detector 20 is mounted on the upper surface of the upper chamber 15 so as to produce a signal corresponding to the distance L between the flux detector 20 and the permanent magnet 19 which distance is changed in accordance with the deformation of the diaphragm 14. An MR element or a Hall element is used as the flux detector 20.

When fuel evaporation gas is generated in the fuel tank 7, the force corresponding to the pressure of this gas acts on the diaphragm 14 to move the same upward. When the diaphragm 14 is thus deformed, the permanent magnet 19 also moves upward together with the diaphragm 14, and the flux detector 20 produces an electrical signal corresponding to the amount of this displacement (the distance L).

A communication passage 21 is provided in the lower chamber 16, and an electromagnetic on-off valve 22 is provided in the communication passage 21. More specifically, a valve element 23 is urged by a spring 24 in a direction to close the communication passage 21, and upon excitation of a coil 25, the valve element 23 is moved against the bias of the spring 24 so as to open the communication passage 21. A communication passage 26 is provided in the upper chamber 15, and the communication passages 26 and 21 merge together at their distal end portions. Provided between the communication passages 26 and 21 are a pair of relief valves 27 and 28 (positive pressure relief valve 27 and negative pressure relief valve 28) which relieve the gas of opposite directions, respectively. More specifically, valve elements 31 and 32, received respectively in communication passages 29 and 30 provided between the communication passages 26 and 21, are urged respectively by springs 33 and 3 in directions to close the communication passages 29 and 30, respectively, and when a pressure greater than a set load of the spring 33 or 34 is acted upon the valve element 31 or 32, each valve is opened. In this embodiment, the set load of the spring 33 is +18mmHg (relative pressure), and the set load of the spring 34 is −22mmHg (relative pressure).

As shown in FIG. 1, the communication passages 26 and 21 are communicated with a surge tank 35 of the intake system via a purge pipe 36, and a canister 37 containing an absorption material of activated carbon is provided in the purge pipe 36. Fuel evaporation gas in the fuel tank 7 is absorbed by the activated carbon in the canister 37. An atmosphere opening hole 38 for drawing fresh air is provided at the canister 37. That portion of the purge pipe 36 extending from the canister 37 toward the surge tank 35 serves as a discharge passage 39, and a solenoid valve 40 (hereinafter referred to as "a purge valve") serving as an opening/ closing means is provided in the discharge passage 39.

In the purge valve 40, a valve element 41 is normally urged by a spring (not shown) in a direction to open a valve seat 42, and when a coil 43 is excited, the valve element 41 closes the valve seat 42. Therefore, upon deenergization of the purge valve 40, the discharge passage 39 is opened, and upon excitation of the purge valve 40, the discharge passage 39 is closed.

A control circuit 44, containing a microcomputer and acting as a gas generation amount detection means, a judgment means and a judgment control means, receives a throttle opening signal from a throttle sensor (not shown) for detecting the degree of opening of the throttle valve 5, an engine speed signal from a rotational speed sensor (not shown) for detecting the engine speed of the engine 1, an intake air amount signal from an intake amount sensor (not shown) for detecting the amount of the intake air, a cooling water temperature signal from a water temperature sensor (not shown) for detecting the temperature of engine cooling water, an intake air temperature signal from an intake air temperature sensor (not shown) for detecting an intake air temperature, and a vehicle speed signal from a vehicle speed sensor (not shown). The control circuit 44 detects, from these signals, the degree of opening of the throttle valve 5, the engine speed, the intake air amount, the temperature of the engine cooling water, the intake air temperature, the vehicle speed, and the running distance.

Figure 3:
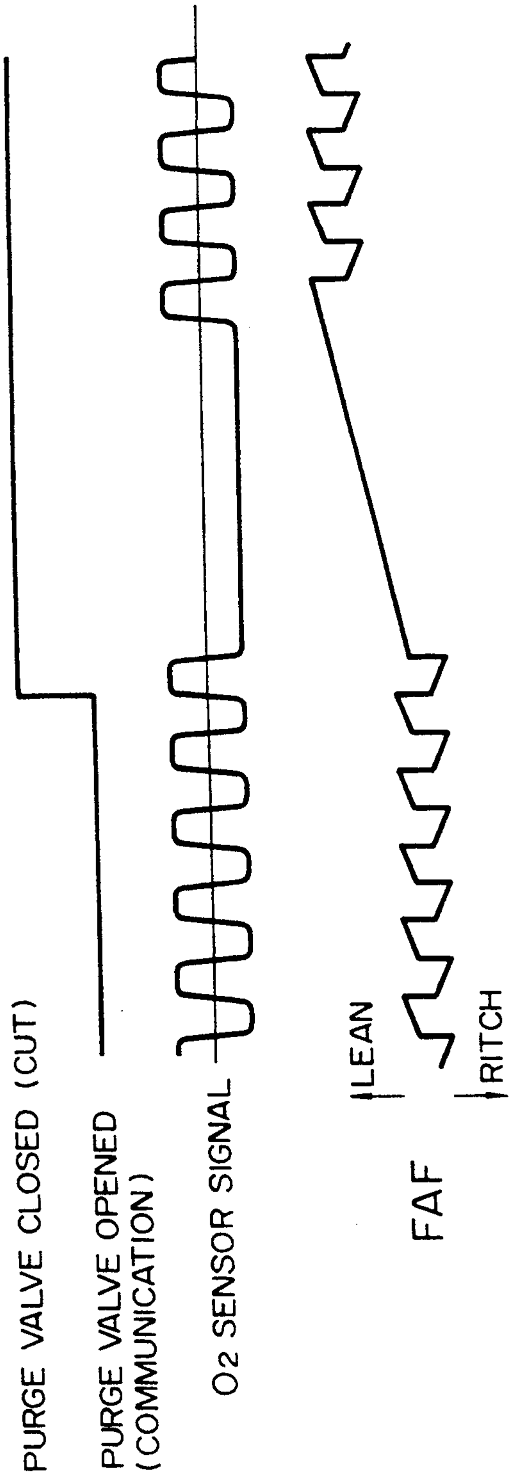
FIG. 3 is a diagram explanatory of the processing of a sensor signal.

The control circuit 44 also receives a signal from the $O_2$ sensor so as to judge whether the air-fuel mixture is rich or lean. When the air-fuel mixture is inverted from the rich condition to the lean condition, or from the lean condition to the rich condition, the control circuit 44 changes or skips a feedback amendment factor FAF stepwise so as to increase or decrease the fuel injection amount as shown in FIG. 3, and also the control circuit 44 gradually increases or decreases the feedback amendment factor FAF when the air-fuel mixture is rich or lean. This feedback control is not effected when the temperature of the engine cooling water is low, or when the engine is under a high load or at a high speed. Further, the control circuit 44 determines a fundamental injection time on the basis of the engine speed and the air intake amount, and amends the fundamental injection time by the feedback amendment factor FAF and etc., to determine a final injection time so that the fuel injection can be effected by the fuel injection valve 4 at a predetermined injection timing.

The control circuit 44 also receives a signal from the flux detector 20. The control circuit 44 is connected to the electromagnetic on-off valve 22 and the purge valve 40 so as to control the opening and closing of these valves 22 and 40. A warning lamp (warning means) 45 is provided on an instrument panel of the vehicle, and is connected to the control circuit 44.

The operation of the above self-diagnosis apparatus in the system for preventing the scattering of the fuel evaporation gas will now be described.

Figure 4:
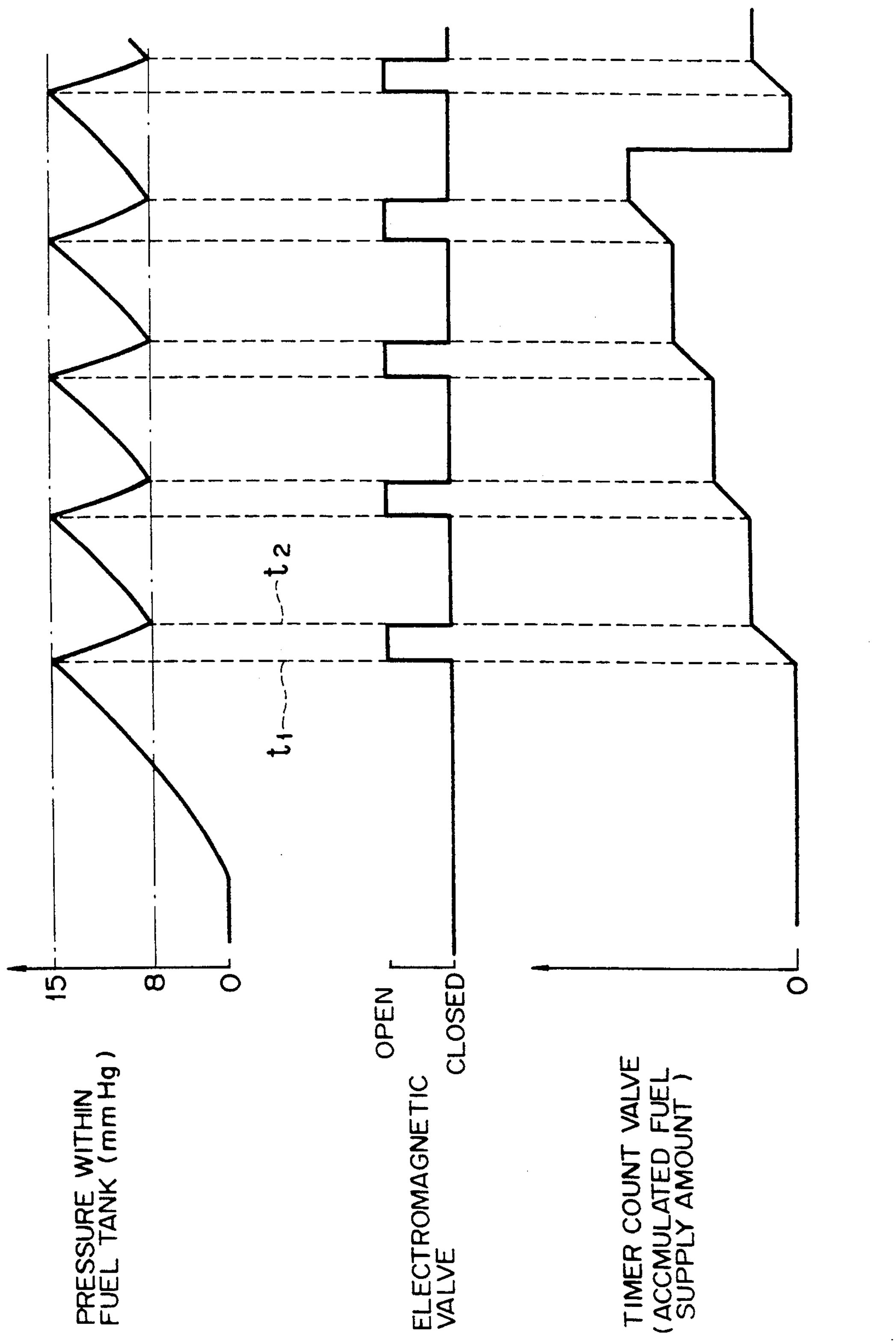
FIG. 4 is a diagram explanatory of the processing of the sensor signal.

Normally, the electromagnetic on-off valve 22 is closed, and when the fuel in the fuel tank 7 begins to evaporate, the pressure within the fuel tank 7 increases since the fuel tank 7 is sealed. The pressure within the fuel tank 7 acts on the diaphragm 14 to move the permanent magnet 19, mounted on the diaphragm 14, upward. The electrical signal representative of this upward movement is outputted from the flux detector 20 to the control circuit 44. The control circuit 44 judges whether the pressure within the fuel tank 7 reaches 15mmHg and 8mmHg in FIG. 4.

When this pressure reaches 15mmHg (at a timing t1 in FIG. 4), the control circuit 44 opens the electromagnetic on-off valve 22, and also begins to count this valve opening time.

Thus, by opening the electromagnetic on-off valve 22, the pressure within the fuel tank 7 is decreased, so that the diaphragm 14 moves downward to be restored into its initial position. Then, when the pressure within the fuel tank 7 reaches 8mmHg (at a timing t2 in FIG. 4), the control circuit 44 closes the electromagnetic on-off valve 22, and also ceases to count the valve opening time.

Figure 5:
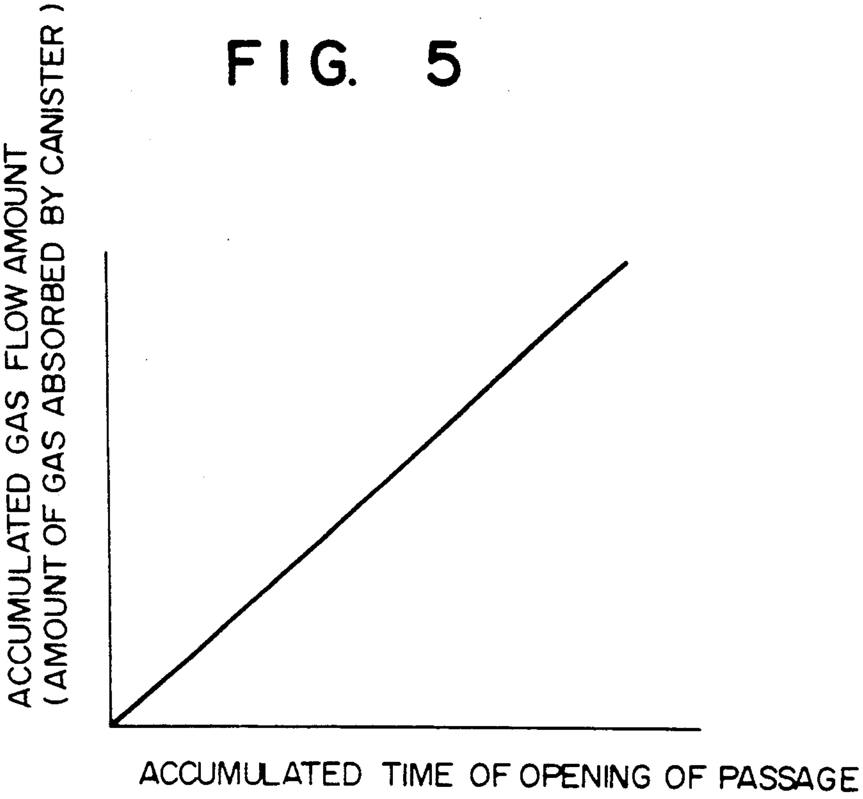
FIG. 5 is a graph showing the relation between the time of opening of a fuel evaporation gas discharge passage and an accumulated gas flow amount.

During the time when the fuel continues to evaporate because of the temperature rise of the fuel in the fuel tank 7, the above operation is repeated, and the valve opening time of the electromagnetic on,-off valve 22 is accumulated. This accumulation time corresponds to the accumulated amount of flow of the gas from the tank 7 to the canister 37, as shown in FIG. 5.

Figure 6:
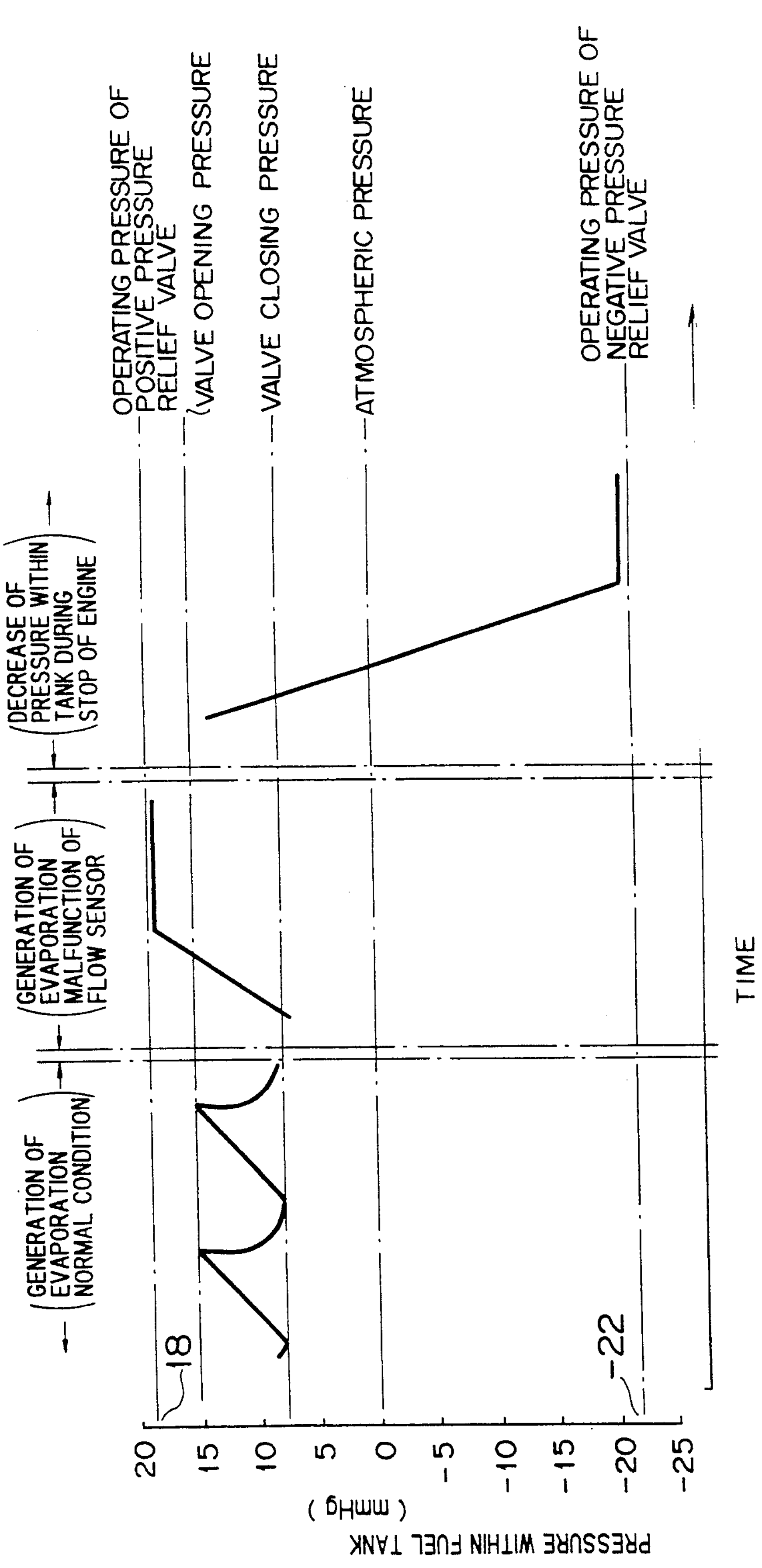
FIG. 6 is a diagram showing variations in the pressure within a fuel tank.

However, when the electromagnetic on-off valve 22 in its fully-closed condition is subjected to malfunction, or when the flux detector 20 is subjected to malfunction, the fuel gas pressure within the fuel tank 7 increases. In this case, when the pressure within the tank 7 reaches 18mmHg, the positive pressure relief valve 27 is opened, as shown in FIG. 6 to feed the evaporation gas from the fuel tank 7 toward the canister 37, so that the pressure within the tank 7 is kept to below 18mmHg, thereby preventing the deformation (bulge) of the tank 7. On the other hand, when the fuel evaporation gas to be generated due to a temperature drop of the fuel the tank 7 as when the engine is stopped, the pressure within the tank 7 becomes negative due to the temperature drop of the evaporation gas in the tank 7, so that the tank 7 tends to be deformed to be shrinked. However, when the pressure reaches −22mmHg, the negative pressure relief valve 28 is opened to introduce the air from the canister side into the fuel tank 7, so that the pressure is kept to above more than −22mmHg, thereby preventing the deformation (shrinkage) of the tank 7.

Figure 7:
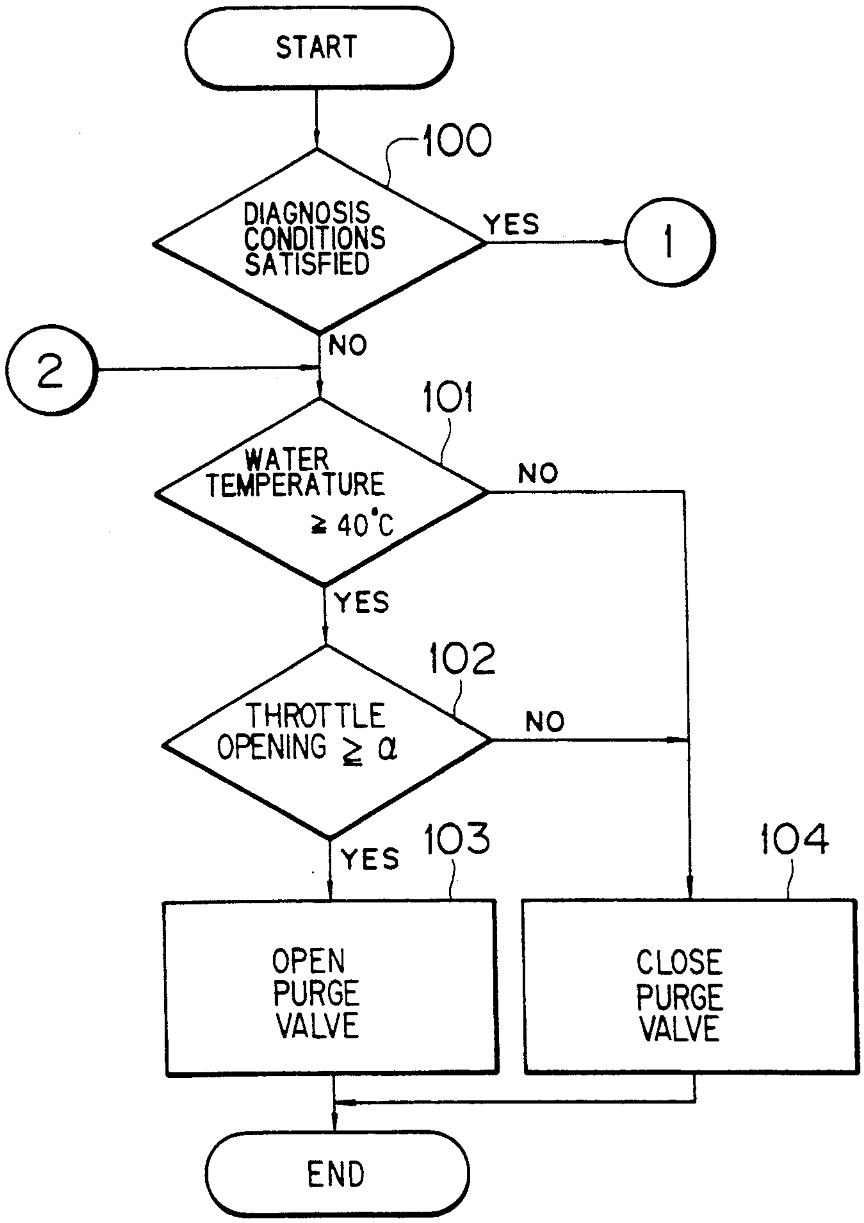
FIG. 7 is a portion of a flow chart explanatory of the operation of the self-diagnosis apparatus of the invention.
Figure 8:
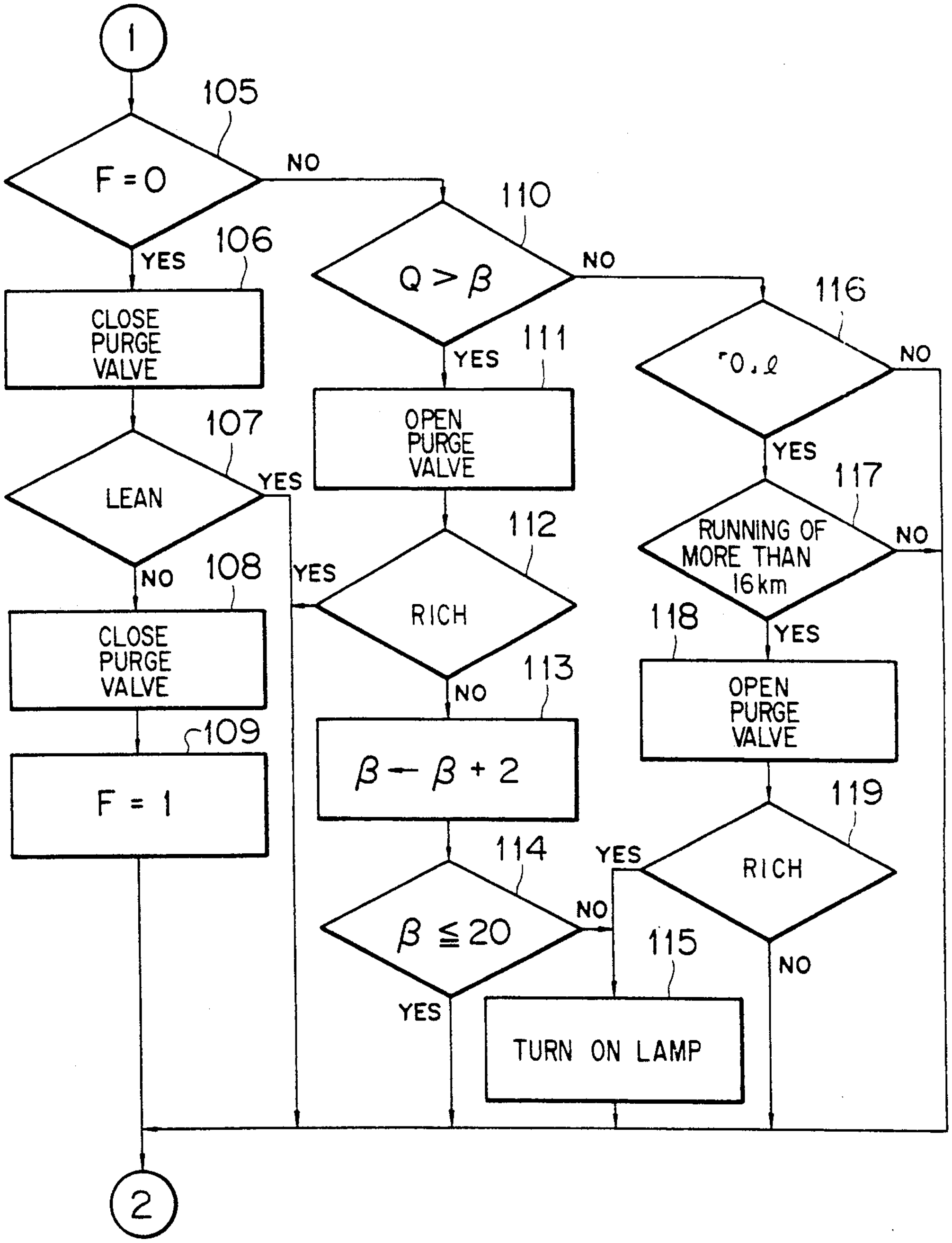
FIG. 8 is another portion of the above flow chart.
Figure 9:
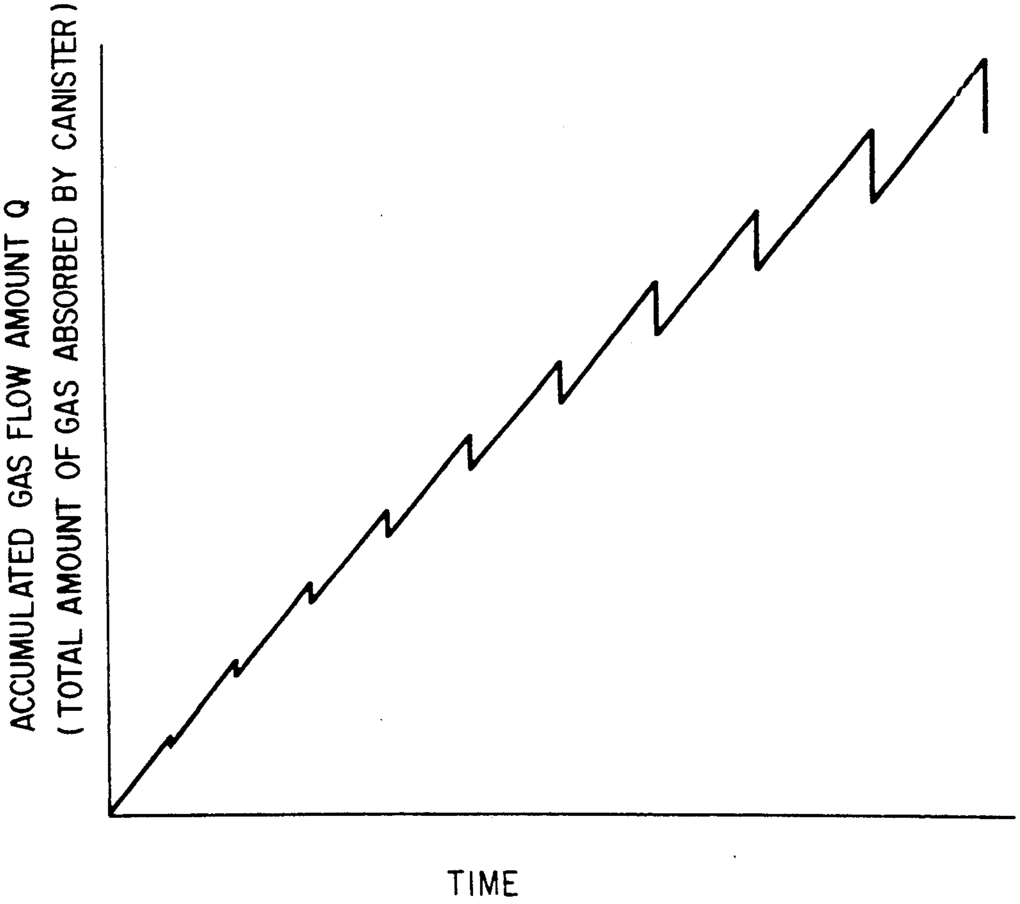
FIG. 9 is a time chart showing the accumulated gas flow amount.

Next, the self-diagnosis by the control circuit 44 will now be described. FIGS. 7 and 8 show a control routine of the purge valve 40 executed at predetermined time intervals.

When an ignition switch is turned on, the control circuit 44 sets the accumulated gas flow amount Q to "0", sets a flag F (later described) to "0", and sets a comparative value $\beta$ for the accumulated gas flow amount Q to 2 liters. Then, in Step 100, the control circuit 44 judges whether or not the conditions of the diagnosis are satisfied. The diagnosis conditions are satisfied when the temperature of the engine cooling water is not less than 80° C. and also when the self-diagnosis has not been effected even once after the turning-on of the ignition switch. If the temperature of the engine cooling water is less than 80° C., the control circuit 44 judges in Step 101 whether or not the temperature of the engine cooling water is not less than 40° C. If the judgement result in Step 101 is that the temperature of the engine cooling water is not less than 40° C., the control circuit 44 judges in Step 102 whether or not the degree of opening of the throttle valve 5 is not less than a predetermined value $\alpha$. If the judgment result in Step 102 is that the degree of opening of the throttle valve 5 is not less than the predetermined value $\alpha$, the control circuit 44 opens the purge valve 40 in Step 103. If the temperature of the engine cooling water is less than 40° C. in Step 101 or if the degree of opening of the throttle valve 5 is less than the predetermined value $\alpha$ in Step 102, the control circuit 44 closes the purge valve 40 in Step 104.

On the other hand, in Step 100, when the temperature of the engine cooling water becomes not less than 80° C. for the first time after the turning-on of the ignition switch, thus satisfying the diagnosis conditions, the control circuit 44 judges in Step 105 whether or not the flat F is "0". At first, since F=0 is provided, the program proceed to Step 106. The control circuit 44 closes the purge valve 40 in Step 106, and judges in Step 107 whether or not the feedback amendment factor FAF is lean. Namely, in the normal operating condition of the apparatus with the purge valve 40 opened to discharge the fuel evaporation gas, absorbed by the activated carbon, to the intake system, when the purge valve 40 is closed, the fuel evaporation gas ceases to be supplied to the intake manifold 2, so that the air-fuel ratio becomes lean, and by closing the purge valve 40, the FAF varies. However, if the FAF does not become greater, there is a possibility that some abnormality, such as the clogging of the purge pipe 36, is encountered.

Then, if the feedback amendment factor FAF does not vary before or after the time of closing the purge valve 40, the purge valve 40 is kept closed in Step 108, and the flag F is brought to "1"in Step 109.

In the subsequent cycles of the routine, since F=1 is provided in Step 105, the program proceeds from Step 105 to Step 110. Then, the control circuit 44 judges in Step 110 whether or not the accumulated gas flow amount Q is the comparative value $\beta$. At this time, the comparative value $\beta$ is 2 liters. If the judgment result in Step 110 is that the accumulated gas flow amount Q is the comparative value $\beta$, the control circuit 44 opens the purge valve 40 for a short time in Step 111 so as to discharge the fuel evaporation gas absorbed by the activated carbon in the canister 37. Then, it is judged in step 112 whether or not the feedback amendment factor FAF is rich. Namely, in the normal operating condition of the apparatus, when the purge valve 40 is opened after a predetermined amount of the fuel evaporation gas is absorbed by the activated carbon in the closed condition of the purge valve 40, the fuel evaporation gas absorbed by the activated carbon in the canister 37 is supplied to the intake manifold 2, so that the air-fuel ratio becomes rich, and by opening the purge valve 40, the FAF is varied. However, if the FAF is not varied, there is a possibility that some abnormality, such as the clogging of the purge pipe 36, is encountered.

If the judgment result in Step 112 is that the feedback amendment factor FAF is not rich, the control circuit 44 adds 2 liters to the comparative value $\beta$ of the accumulated gas flow amount Q in Step 113, so that the comparative value $\beta$ becomes 4 liters. Then, the control circuit 44 judges in Step 114 whether or not the comparative value $\beta$ is 20 liters, and if this judgment result is "NO", the program quits this routine.

By repeating the sequence of Steps 100, 105, 110, 111, 112, 113 and 114, the amount of absorption by the activated carbon in the canister 37 is increasing through the instantaneous opening of the purge valve 40 in Step 111. The comparative value $\beta$ of the accumulated gas flow amount Q increases by 2 liters per cycle, and in any case the judgment result in Step 112 will not be rich, and when the comparative value $\beta$ reaches 20 liters, the warning lamp 45 is turned on in Step 115.

On the other hand, if it is judged in Step 110 that the accumulated gas flow amount Q does not reach the predetermined value $\beta$, the control circuit 44 judges in Step 116 whether or not the accumulated gas flow amount Q is "0". If this judgment result is Q=0, the program proceeds to Step 117. In Step 117, it is judged whether or not the vehicle has run not less than 16 km (10 miles) after the purge valve 40 has been closed. If this judgment result is that the vehicle has run not less than 16 km, the purge valve 40 is opened for a short time in Step 118. Then, in Step 119, it is judged whether or not the air-fuel ratio is rich. If this judgment result is "rich", then the warning lamp 45 is turned on in Step 115, judging that some abnormality, such as an electrical connection failure in the flux detector 20, is encountered. Namely, in the condition in which the vehicle runs not less than 16 km (10 miles) after the purge valve 40 is closed in Step 108, if the feedback amendment factor FAF is varied by opening the purge valve 40, this means that the fuel evaporation gas is fed from the fuel tank 7 to the canister 37. However, if the result of detection of the gas flow amount is Q=0, this means that some abnormality, such as an electrical connection failure in the flux detector 20, is encountered.

As described above, in this embodiment, the gas flow amount detection means is constituted by the diaphragm 14, the permanent magnet 19, the flux detector 20 and the control circuit 44. The control circuit 44 controls the purge valve 40 (the opening/closing means) to close the discharge passage 39, and in this condition when the amount of the gas fed from the fuel tank 7 to the canister 37 exceeds the set value, the control circuit 44 controls the purge valve 40 to close and open the discharge passage 39, and judges in accordance with a change or variation in the air-fuel ratio (the feedback amendment factor FAF) obtained at this time by the $O_2$ sensor (the air-fuel ratio detection means) 6 whether or not there exists any abnormality. Then, if this judgment result is that some abnormality exists, the set value of the gas flow amount is changed to a greater value (the set value plus 2 liters), and then the abnormality judgment is again effected. If this judgment result is that the abnormality exists, the warning lamp (warning means) lamp 45 is turned on to give warning. In the apparatus of Japanese Patent Application No. 2-195474, no consideration is given to variations in the fuel gas density (variations in the ambient temperature, variations in the volatility of the fuel, and etc.) due to the residual air in the fuel tank, and therefore even though the amount of the gas supplied from the fuel tank to the canister is above the predetermined value, the amount of the fuel evaporation gas absorbed by the canister is small if the fuel gas density is low, and no change in air-fuel ratio appears even when the purge valve is opened and closed, which results in the possibility of judging that abnormality exists. In this embodiment, however, if it is judged that the amount of flow of gas supplied from the fuel tank to the canister exceeds the predetermined value (that is, there exists abnormality) when detecting the supply abnormality (i.e., failure to lead the fuel evaporation gas into the intake passage), the judgment is again effected with the set value increased, and by doing so, the abnormality can be accurately detected, taking into consideration variations in the fuel gas density (variations in the ambient temperature, variations in the volatility of the fuel, and etc.) due to the residual air in the fuel tank.

Figure 10:
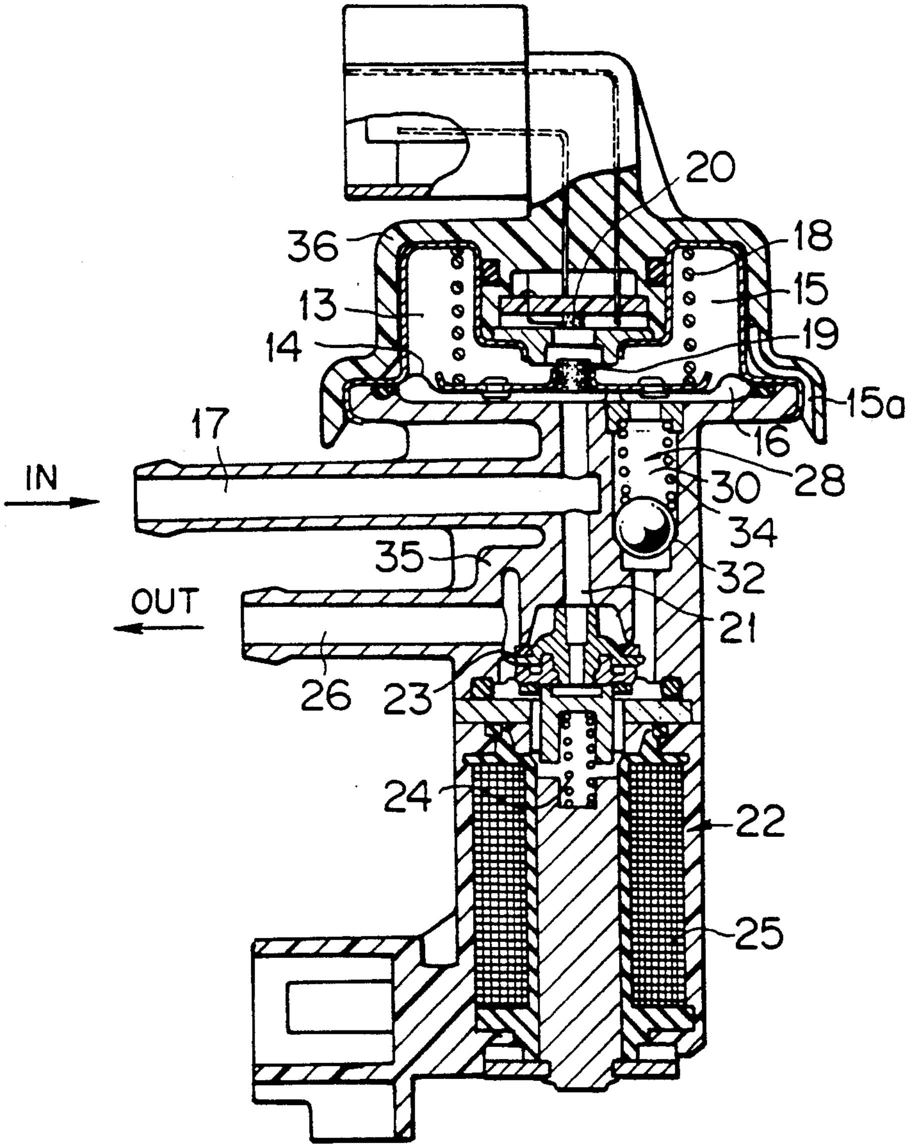
FIG. 10 is a cross-sectional view of another example of fuel evaporation gas flow amount sensor of the invention connected to the fuel tank.
Figure 11:
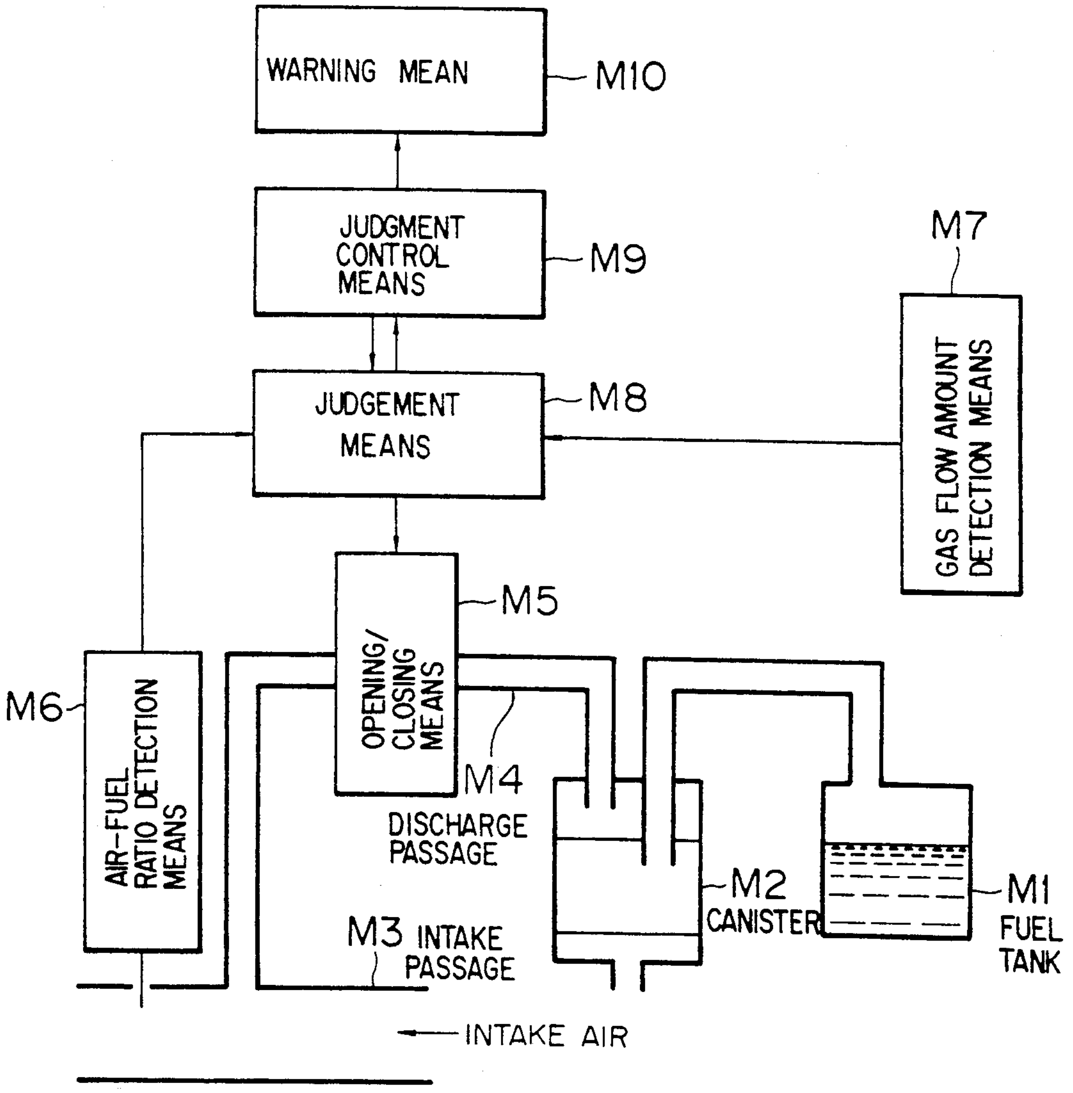
FIG. 11 is a diagram showing the principle of the present invention.

Although the present invention has been described with respect to one preferred embodiment thereof, various modifications can be made without departing from the scope of the present invention. FIG. 10 shows another embodiment of the invention provided by modifying the gas flow amount sensor of FIG. 2. Those portions of this embodiment having the same functions as those of the embodiment of FIG. 2 are designated by identical reference numerals, respectively. A communication passage 17 is connected to an upper portion of a fuel tank (not shown), and is connected to a communication passage 26 via a communication passage 21. The communication passage 26 is connected to the canister. An electromagnetic on-off valve 22 opens and closes the communication passage 21. The electromagnetic on-off valve 22 comprises a valve element 23, a spring 24 for urging the valve element 23 in a direction to close the communication passage 21, and a coil 25 which, when excited, moves the valve element 23 downward against the bias of the spring 24 so as to open the communication passage 21. A cover member 36 is fixedly mounted on a block 35, having the communication passages 17, 21 and 26, to form a diaphragm chamber 13. The diaphragm chamber 13 is divided by a diaphragm 14 into two chambers 15 and 16, and the lower chamber 16 is communicated with the communication passage 21. A spring 18 is mounted within the upper chamber 15, and urges the diaphragm 14 downward by its urging force. A permanent magnet 19 is fixedly secured to the diaphragm 14, and a switch 20 is mounted in the upper chamber 15 in opposed relation to the permanent magnet 19, and produces a signal corresponding to the distance between the switch 20 and the permanent magnet 19 which distance is changed in accordance with the deformation of the diaphragm 14. Although in the embodiment of FIG. 2, the upper chamber 15 is communicated with the canister 37 (see FIG. 1) via the communication passage 26, in this embodiment, the upper chamber 15 is communicated with the atmosphere via a passage 15*a*. Provided between the lower chamber 16 and the communication passage 26 is a communication passage 21. A negative pressure relief valve 28 is provided in the communication passage 30. The negative pressure relief valve 28 comprises a valve element 32, and a spring 34 for urging the valve element 32 in a direction to close the communication passage 30.

The operation of this embodiment is the same as that of the embodiment of FIG. 2. Namely, the diaphragm 14 receives the pressure of the evaporation gas of the fuel in the fuel tank via the communication passage 17, and is moved, and the switch 20 outputs a signal, corresponding to the gas pressure, to the control circuit 44 (see FIG. 1). When the gas pressure within the tank exceeds a predetermined value, the control circuit 44 opens the electromagnetic on-off valve 22, and also begins to count this valve opening time. Then, when the gas pressure within the tank decreases and goes below the predetermined value, the control circuit 44 closes the electromagnetic on-off valve 22, and also ceases to count the valve opening time. It is estimated that the gas has flowed into the canister in an amount corresponding to the counted valve opening time. When the pressure within the tank becomes negative due to a temperature drop of the evaporation gas in the tank, and goes below a predetermined value, the negative pressure relief valve 28 is opened, so that the air is introduced from the canister side into the fuel tank, thereby preventing the deformation of the tank.

As described above, in the present invention, there is achieved an excellent advantage that when detecting the supply abnormality (i.e., failure to lead the fuel evaporation gas into the intake passage), the abnormality can be accurately detected, taking into consideration variations in the fuel gas density due to the residual air in the fuel tank.

What is claimed is:

1. A self-diagnosis apparatus in a system for preventing the scattering of fuel evaporation gas, comprising:

a fuel tank;

a canister containing an absorption material for absorbing fuel evaporation gas in said fuel tank;

a communication passage communicating said fuel tank with said canister;

a discharge passage communicating said canister with an intake passage of an internal combustion engine;

opening/closing means provided in said discharge passage so as to open and close said discharge passage;

air-fuel ratio detection means for detecting an air-fuel ratio of an air-fuel mixture supplied to said internal combustion engine;

gas flow amount detection means for detecting the amount of flow of the gas supplied from said fuel tank to said canister;

judgment means for controlling said opening/ closing means to close said discharge passage, and then for controlling said opening/closing means to close and open said discharge passage when said gas flow amount detection means detects that the amount of the gas flow supplied from said fuel tank to said canister exceeds a set value, and for judging in accordance with a change in the air-fuel ratio detected at this time by said air-fuel ratio detection means whether or not any abnormality exists;

judgment control means for setting said set value of said gas flow amount to a value greater than said set value when said judgment means judges that there exists abnormality, and then for causing said judgment means to again judge whether or not there is any abnormality; and warning means for giving warning when the result of the judgment of said judgment means executed by said judgment control means indicates that there is abnormality.

2. A self-diagnosis apparatus according to claim 1, further comprising second opening/closing means provided in said communication passage so as to open and close said communication passage, and gas pressure detection means for detecting the pressure of the fuel evaporation gas in said fuel tank;

said gas flow amount detection means comprising a control circuit, said control circuit operating said second opening/closing means to open said communication passage when the pressure of the fuel evaporation gas detected by said gas pressure detection means reaches a first set value in the closed condition of said communication passage, said control circuit operating said second opening/closing means to close said communication passage when the pressure of the fuel evaporation gas detected by said gas pressure detection means goes below a second set value smaller than said first set value, and said control circuit calculating the time of opening of said communication passage.

3. A self-diagnosis apparatus according to claim 2, in which there is provided relief opening/closing means which normally closes said communication passage, and opens said communication passage when the pressure of the fuel evaporation gas in said fuel tank reaches a predetermined value greater than said first set value.

4. A self-diagnosis apparatus according to claim 3, in which there is provided second relief opening/ closing means which normally closes said communication passage, and opens said communication passage when the pressure of the fuel evaporation gas in said fuel tank reaches a predetermined value smaller than said second set value.

5. A self-diagnosis apparatus according to claim 2, in which there is provided relief opening/closing means which normally closes said communication passage, and opens said communication passage when the pressure of the fuel evaporation gas in said fuel tank reaches a predetermined value smaller than said second set value.

* * * * *